Dec. 15, 1936.  J. G. HEASLET  2,064,747
FRONT END SUSPENSION FOR TRACK LAYING TRACTORS
Filed April 22, 1935
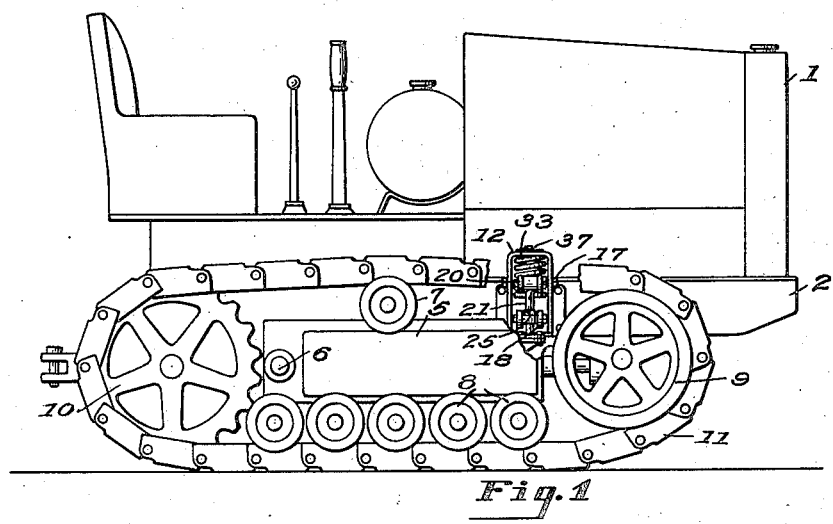
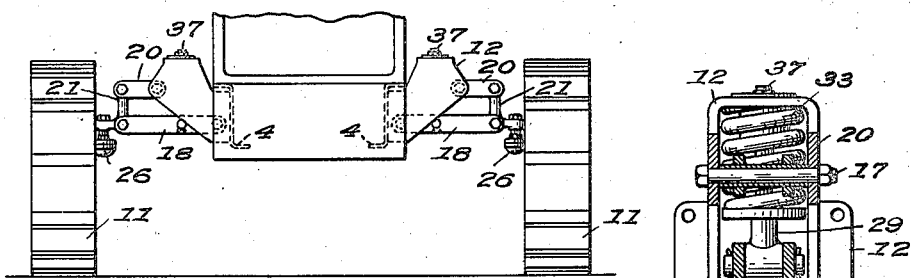
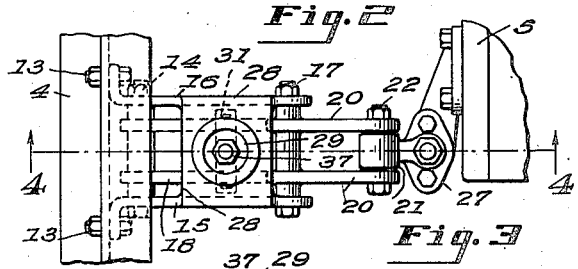
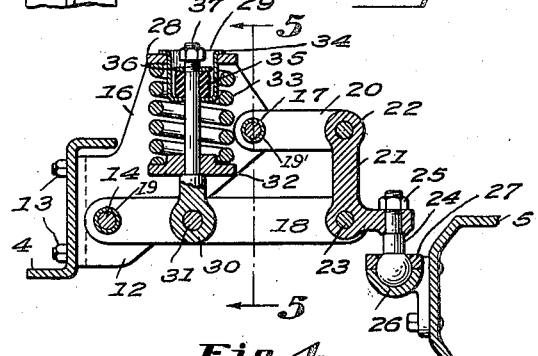
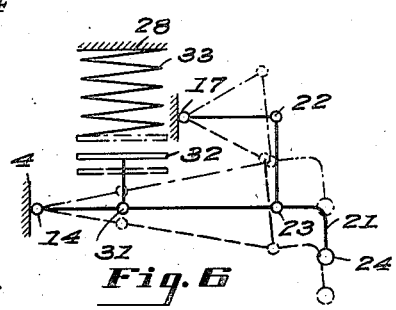
INVENTOR
JAMES G. HEASLET.
BY
George Douglas Jones
ATTORNEY Patented Dec. 15, 1936

2,064,747

UNITED STATES PATENT OFFICE 2,064,747

FRONT END SUSPENSION FOR TRACK LAYING TRACTORS

James G. Heaslet, Cleveland, Ohio, assignor to The Cleveland Tractor Company, Cleveland, Ohio Application April 22, 1935, Serial No. 17,720

10 Claims. (Cl. 305—9)

This invention relates to crawler or tracklaying tractors.

More particularly the invention pertains to a new and novel front end suspension for the pivoted track frames of this type of tractor.

An object of the present invention is to construct a crawler or track-laying tractor in which the pivoted track frames have unrestricted individual vertical movement while all lateral movement is arrested.

A further object is the provision of a front end suspension for tractors which permits the entire traction portion of both track members to always be in contact with the ground, regardless of the unevenness of the terrain.

In the drawing, Fig. 1 is a side elevation of the complete tractor with partly broken portion showing the front track suspension.

Fig. 2 is a front elevation showing the front end suspension partly in dotted lines.

Fig. 3 is an enlarged top detail view partly in dotted section.

Fig. 4 is a vertical cross-section taken on line 4—4 of Fig. 3.

Fig. 5 is a vertical view partly in cross-section taken on line 5—5 of Fig. 4.

Fig. 6 is a diagrammatical representation of the action of the front end suspension.

More specifically in the drawings, numeral 1 represents a tracklaying tractor of the Cletrac or crawler type, while 2 represents the main chassis frame having parallel side members 4. Tubular side track frames 5 are pivotally connected to opposite rearward portions of the tractor through the medium of pivot shafts 6. The side track frames 5 carry upper track rollers 7 and a series of lower track rollers 8. The front idler sprocket 9 is also carried on the front end of track frame 5.

Side drive sprockets 10 are mounted at the rear end of the tractor and receive power from the tractor engine through suitable transmission mechanism. Around the sprockets 9 and 10 and track rollers 7 and 8 are stretched articulated chains 11 composed of pivotally connected links. The weight of the tractor rests on the ground engaging links supported on the lower track rollers 8.

Heretofore, the forward end of the main tractor frame has been supported by conventional spring assemblies or cross link systems running from the front ends of the side track frames to the main tractor or chassis frame. Practically all of these prior suspension devices have proved unsatisfactory, as they do not permit the full length of the lower sections of tracks to be in contact with the terrain under all ground conditions; for when encountering obstacles and passing over rough ground the front of the tractor would rise up and pound downward with not only injury to the tractor, but to the great discomfort of the driver. Further, these prior front end suspensions failed to allow unrestricted individual vertical movement of each track and, consequently, much traction and loss of pulling power resulted.

By the use of the present invention it has been found possible to secure full power to all the shoes on the ground engaging portions of the track, regardless of the unevenness of the terrain. This is accomplished by a new and novel front end suspension for the tractor. This suspension permits substantially vertical independent movement of each track member without materially disturbing the level of the main tractor frame and each side track assembly may pivot freely on its horizontal pivot.

In carrying out the invention a compensating system of spaced interconnected horizontal levers is employed, the outer extension point of the levers being so arranged that the true center of the extension point may have considerable vertical movement without varying from a substantially vertical plane. This permits the forward portions of the track frames to individually move either up or down, and without any substantial lateral movement with relation to the main frame. The vertical movement of the tracks scribes a radially extending arc from the horizontal pivotal point of the track frame, while being positively restrained from any lateral movement. This is accomplished regardless of the unevenness of the ground traversed.

The mechanism for accomplishing this result will be readily understood from the drawing, where it is seen that each pivoted track frame 5 is tied to opposite sides 4 of the forward portion of the main tractor frame 2 through the medium of an inverted U-shaped pressed metal bracket 12, and fastened thereto by bolts 13. To the lower portion of the brackets 12 adjacent the tractor frame there is secured a fixed horizontal pivot bolt 14 which extends through the side arms 15 and 16 of the bracket 12. Also extending through the side arms 15 and 16 in outer elevated spaced parallel relation to the lower pivot bolt 14 is a second pivot bolt 17. The lower pivot bolt 14 carries a pair of spaced laterally extending spaced horizontal link members 18 threaded thereon and retained in spaced relation from the side walls of the bracket and each other by means of spacer collars 19.

A second pair of shorter parallel spaced horizontal link arms 20 are threaded on upper offset pivot bolt 17, and these link arms 20 are held in spaced relation by spacer collars 19'. These spacer elements may be loosely threaded on the pivot bolts or they may be permanently fastened to the side walls of their respective links.

Pivotally connecting the outer ends of the pairs of spaced horizontal links 18 and 20 by means of pivot bolts 22 and 23 is a depending bell crank lever 21.

A hardened ball 24 formed on the lower end of bolt 25 is affixed to the horizontal offset portion of the bell cranks 21, and rests in a socket member 26 secured to the inside of the forward portion of the pivoted side frame 5 and is retained therein by means of a bolted top socket plate 27.

Depending from an opening in the top portion 28 of the inverted U brackets 12 is a bolt 29 having a lower eye 30, through which is placed the pivot pin 31 and, as illustrated in Figs. 4 and 5, the pin 31 passes through the lower eye 30 and the spaced side links 18.

A lower stop plate 32 rests on a shoulder formed adjacent the eye of the bolt and around the bolt 29 and lying between the stop plate 32 and the top portion 28 of the brackets is a compression spring 33.

Adjustment of the links 18 and 20 and the tension of the spring 33 is secured by passing the threaded end of the bolt 29 through a cup 34 depending through an opening formed in the top plate 28. A rubber or other resilient washer 35 rests in the bottom of the cup and the bolt is threaded through it. A washer 36 is placed on top of the resilient member 35, so that the whole assembly may be compressed by tightening up on the nut 37.

Therefore, it is apparent that the forward section of the tractor is suspended on either side through the before-mentioned linkage mechanism, and the weight of the front of the tractor is carried by the pivoted side frames through the ball and socket arrangement.

Referring to the diagrammatic showing in Fig. 6, it will be seen that the salient feature of the invention is the fact that the center of the ball 24 always travels in a true vertical plane and does not scribe a lateral arcuate path. The dotted lines of Fig. 6 represent the position of the links in maximum upper and lower positions of the track.

The amount of vertical movement is primarily regulated by the length of the links, although an adjustment of some magnitude may be made by taking up or loosening the nut 37.

As shown, the suspension revolves or oscillates on the pivot bolts 14, 17, 22, and 23 whenever the forward track sections rise or fall from their normal or level position. During any such movement the links and bell crank tend to assume the position indicated in dotted lines, while the main frame of the tractor remains substantially level. Of course, the main frame moves gradually up or down but this movement is smooth and not accompanied by the tremendous pounding resulting from the prior type of suspension. The coil spring 33 and resilient washer 35 operate as a shock absorber, as upward movement of the tracks tends to compress the spring and downward movement of the tracks compresses the washer.

Each track member, therefore, is free to move up or down from its normal position, and the movement of one track has no corresponding movement on the other track. Furthermore, the chassis of the tractor is maintained in a practically constant horizontal plane and does not rear or buck in running over rough ground.

This novel link suspension eliminates all tendency of the tracks to flare outwardly, as the oscillation or movement of the ball 24 compensates for the normal arcuate pull of the tracks when moving up or down and the tendency of the tracks to spread laterally is restrained.

By allowing the full track to be continuously in contact with the ground practically no traction is lost. Consequently, a machine equipped with this invention has a considerable greater draw bar pull than a similarly rated tractor not so equipped.

Other embodiments of the invention employing the same or equivalent principles may be used and structural changes made as desired by those skilled in the art without departing from the present invention and within the spirit of the appended claims.

What I claim is:

1. In a crawler type tractor, a main frame, rearwardly pivoted side frames attached thereto, endless track belts encircling said side frames, the forward end of each of said side frames being solely connected to said main frame through a resiliently supported laterally extending link mechanism, said link mechanisms being horizontally pivoted to said main frame and so constructed and arranged as to permit the said side frames to have relative movement only in a true vertical plane.

2. In a tractor, a main frame, track frames pivoted to each side of said main frame, laterally extending horizontal linkage mechanism affixed to the opposite sides of the forward portions of said main frame and connecting the said main frame and the said oppositely pivoted track frames, the said laterally extending linkage mechanisms so constructed and arranged as to permit the front portions of each of said track frames to freely and individually move in a vertical plane while restraining lateral movement thereof.

3. In a crawler type tractor, a main chassis frame, a track frame horizontally pivoted to each side thereof, lateral brackets secured on opposite sides of said main frame, vertically spaced laterally extending horizontal links pivoted to said brackets, dampening means normally restraining the movement of said links, depending bell cranks pivotally connected to the outer ends of said links, and balls secured to the outer ends of the said bell cranks, the said balls being supported in sockets affixed to and adjacent the inner ends of said track frames.

4. A front end suspension for tracklaying tractors of the type having a main chassis frame and an endless track frame pivoted to each side of said chassis frame, including oppositely positioned brackets on the tractor chassis frame, laterally extending horizontal links pivotally secured to the said brackets, compression springs carried by said brackets and resting on said links, the lower links thereof being of greater length than the upper links thereof, bell cranks lying in a substantially vertical plane pivotally connecting the outer ends of said horizontal links, balls affixed to the offset portions of said bell cranks and cooperating sockets carried on the forward inside surfaces of the tractor track frames in which the said balls are retained.

5. A front end suspension for tractors of the type having a chassis frame and pivoted side track frames, the said front end suspension including offset sockets positioned adjacent the inner front ends of the said track frames in which oscillate balls secured to compensating links pivoted to opposite sides of said chassis frame and so constructed and arranged as to permit vertical movement of the front end of each side track frame while preventing lateral movement thereof.

6. A compensating linkage for connecting the chassis frame of a crawler tractor with its pivoted side track frames, including a linkage mechanism secured to opposite sides of the chassis frame and to the forward portions of the side track frames, each of said linkage mechanisms comprising vertically spaced pairs of horizontally pivoted links of unequal length, vertical bell cranks connecting the ends of the pairs of horizontal links, balls affixed to the lower offset termini of the said bell cranks and cooperating spherical sockets mounted adjacent the inner ends of the said side track frames, the said balls being free to oscillate in said sockets as the pivoted side frames move up or down.

7. A front end suspension for tracklaying tractors of the type having a main chassis frame and pivoted endless track frames, including oppositely positioned brackets on the tractor chassis frame, laterally extending horizontal pivoted links secured to the said brackets, the lower links being of greater length than the upper links, resilient compression members positioned between the said brackets and the said lower links, bell cranks lying in a substantially vertical plane pivotally connecting the outer ends of said horizontal links, balls affixed to the lower ends of said bell cranks and cooperating sockets carried on the forward inside surfaces of the tractor track frames in which the said balls are retained.

8. A front end suspension for tracklaying tractors of the type having a main chassis frame and pivoted endless track frames, including oppositely positioned brackets on the tractor chassis frame, laterally extending horizontal pivoted links secured to the said brackets, the lower links being of greater length than the upper links, compression springs affixed to said brackets and pivoted to the lower of said horizontal links, bell cranks lying in a substantially vertical plane pivotally connecting the outer ends of said horizontal links, balls affixed to the lower ends of said bell cranks and cooperating sockets carried on the forward inside surfaces of the tractor track frames in which the said balls are retained.

9. A front end suspension for tracklaying tractors of the type having a main chassis frame and pivoted endless track frames, including oppositely positioned brackets on the tractor chassis frame, laterally extending horizontal pivoted links secured to the said brackets, the lower links being of greater length than the upper links, resilient members affixed to said brackets and bearing on the longer of said horizontal links, bell cranks lying in a substantially vertical plane pivotally connecting the outer ends of said horizontal links, balls affixed to the lower ends of said bell cranks and cooperating sockets carried on the forward inside surfaces of the tractor track frames in which the said balls are retained.

10. A front end suspension for tracklaying tractors of the type having a main chassis frame and pivoted endless track frames, including oppositely positioned brackets on the tractor chassis frame, laterally extending horizontal pivoted links secured to the said brackets, the lower links being of greater length than the upper links, resilient compression members secured to said brackets and said links and tending to hold said links at all times in parallel relationship, bell cranks lying in a substantially vertical plane pivotally connecting the outer ends of said horizontal links, balls affixed to the lower end portions of said bell cranks and cooperating sockets carried on the forward inside surfaces of the tractor track frames in which the said balls are retained.

JAMES G. HEASLET.